United States Patent
Spence et al.

(10) Patent No.: US 6,776,832 B2
(45) Date of Patent: Aug. 17, 2004

(54) COATING COMPOSITIONS FOR FREE-FLOWING DRY MATERIALS AND METHODS OF USING SAME

(75) Inventors: Stacy K. Spence, Winter Haven, FL (US); M. Roger Rixom, Valrico, FL (US)

(73) Assignee: ARR-MAZ Products, L.P., Winter Haven, FL (US)

( * ) Notice: Subject to any disclaimer, the term of this patent is extended or adjusted under 35 U.S.C. 154(b) by 9 days.

(21) Appl. No.: 10/304,256

(22) Filed: Nov. 26, 2002

(65) Prior Publication Data

US 2003/0075075 A1 Apr. 24, 2003

Related U.S. Application Data

(63) Continuation-in-part of application No. 10/053,815, filed on Jan. 22, 2002, now Pat. No. 6,514,332, which is a continuation-in-part of application No. 09/784,570, filed on Feb. 15, 2001, now Pat. No. 6,514,331.

(51) Int. Cl.$^7$ ........................ C09D 5/00; C09D 191/00; C08L 91/00; C05G 3/00; C05G 3/10
(52) U.S. Cl. ............... 106/243; 106/132.2; 106/137.71; 106/243; 106/250; 106/252; 106/259; 106/260; 106/265; 106/267; 106/807; 106/810; 71/64.02; 71/64.07; 71/64.12
(58) Field of Search ................................. 106/250, 252, 106/265, 267, 243, 285, 132.2, 137.71, 259, 260, 807, 810; 71/64.02, 64.07, 64.12

(56) References Cited

U.S. PATENT DOCUMENTS

| 2,225,570 A | 12/1940 | Pfeiffer |
| 2,307,253 A | 1/1943 | Yee et al. |
| 2,389,680 A | 11/1945 | Mikeska |
| 2,877,129 A | 3/1959 | Hardman |
| 3,186,828 A | 6/1965 | Baarson et al. |
| 3,219,433 A | 11/1965 | Brewster et al. |
| 3,223,518 A | 12/1965 | Hansen |
| 3,252,786 A | 5/1966 | Bozzelli et al. |
| 3,306,730 A | 2/1967 | Malmberg et al. |
| 4,081,264 A | 3/1978 | Ali |
| 5,413,856 A | 5/1995 | Swarup et al. |
| 5,578,118 A | 11/1996 | Shuey et al. |
| 5,650,000 A | 7/1997 | Shuey et al. |
| 5,968,222 A | 10/1999 | Kodali |
| 6,156,113 A | 12/2000 | Pasquier |
| 6,355,083 B1 * | 3/2002 | Ogzewalla .................... 71/33 |

OTHER PUBLICATIONS

Aztec Oils technical data—Technical White Oil, wwwaztecoils.co.uk/lucricants/datasheets/industrial/tech%20white%20oil%20Data.pdf, Jan. 30, 2004.*

Caplus AN 2000:584030, Grglewicz et al, "Use of Vegetable Oils and Fatty Acid Methl Esters . . . ", Jul. 25, 2000.

* cited by examiner

Primary Examiner—David Brunsman
(74) Attorney, Agent, or Firm—Dennis G. LaPointe; Mason Law, P.L.

(57) ABSTRACT

Coating compositions containing an oxidized oil and an effective amount of a diluent selected from one of: the group of methyl and ethyl esters of fatty acids, oils and combinations thereof; the group of glycerol and polyglycerol esters of fatty acids, oils, and combinations thereof; and light petroleum oil with a viscosity from about 1 cP to about 100 cP at 100° F., wherein the coating composition has a viscosity of from about 3 cP to about 5000 cP at 140° F., and wherein the coating composition is effective for reducing dust formation and cake formation in the coated free-flowing dry material. The coating compositions and associated methods of the present invention are particularly suited to reduce dust formation and cake formation in free-flowing dry materials.

48 Claims, No Drawings

COATING COMPOSITIONS FOR FREE-FLOWING DRY MATERIALS AND METHODS OF USING SAME

RELATED APPLICATIONS

This application is a continuation-in-part of application Ser. No. 10/053,815 filed Jan. 22, 2002 now U.S. Pat. No. 6,514,332, which is a continuation-in-part of application Ser. No. 09/784,570 filed Feb. 15, 2001 now U.S. Pat. No. 6,514,331.

BACKGROUND OF THE INVENTION

1. Field of the Invention

This invention relates, generally, to coating compositions and methods of using same. In particular, the compositions of the present invention are used to coat free-flowing dry materials. These coating compositions contain an effective amount of a diluent of methyl/ethyl ester of fatty acids, oils and combinations thereof, of glycerols and polyglycerols of fatty acids, oils and combinations thereof, or of light petroleum oil. The compositions of the present invention are particularly suited to reduce dust formation and cake formation in the following free-flowing dry materials: animal feed (i.e., cracked corn, wheat grain, whole oats), micronutrients (i.e., animal feed ingredient $CaHPO_4.2H_2O$, sulfur (powdered or not), iron ore), construction or landscaping material (wood mulch or cement), and other non-fertilizer substrates (flour, vermiculite).

2. Description of the Related Art

The storage and handling of bulk materials present unique problems relating to both dust generation and/or cake formation. Specifically, dust formation and dissemination pose safety, health and environmental problems. Fugitive dust emissions are particularly problematic in the production of free-flowing dry materials. A significant fraction of these materials consists of particles that are small and light enough to become airborne. These materials are generally in rolled, ground, crushed, milled, granular, powder, chipped or shredded forms.

Excessive dust is problematic for both producers and end-users. Specifically, such dust creates numerous problems, including, problems associated with environmental compliance, worker safety, worker productivity and increased maintenance and repair of handling and storage equipment. Elaborate air handling systems must be installed in facilities where these materials are produced, handled or stored to help reduce airborne dust to environmentally safe levels. Dust levels tend to increase over time and are aggravated by prolonged storage at less than ideal conditions. Further, dust poses a problem of spontaneous combustion.

Cake formation presents problems in storing and handling of free-flowing dry materials. Over time, these materials, especially those with a high surface area and hygroscopicity, can form solid masses due to changes in humidity and/or temperature. Prior to application, the material must be broken up to provide a material that is suitable for even distribution and to prevent clogging of distribution machinery.

SUMMARY OF THE INVENTION

In accordance with the present invention, a coated free-flowing dry material, examples of which are (but not limited to) animal feed such as cracked corn, wheat grain, whole oats, animal feed ingredient $CaHPO_4.2H_2O$, wood mulch, flour, vermiculite, sulfur (powdered or not), cement and iron ore and the coating composition comprises:

an oxidized oil; and an effective amount of a diluent selected from either 1) the group of methyl and ethyl esters of fatty acids, oils and combinations thereof, or 2) the group of glycerol and polyglycerol esters of fatty acids, oils, and combinations thereof, or 3) light petroleum oil with a viscosity from about 1 cP to about 100 cP at 100° F.

wherein the composition has a viscosity of from about 3 cP to about 5000 cP at 140° F., and wherein the composition is effective for reducing dust formation and cake formation in the coated free-flowing dry material.

The free-flowing dry material is selected from the group including, but not limited to, rolled, ground, crushed, milled, granular, powder, chipped or shredded solids and combinations thereof. The fatty acids, oils and combinations thereof are derived from animal, plant and synthetic materials.

The oxidized oil may include canola oil, corn oil, cottonseed oil, sunflower oil, soybean oil, linseed oil, castor oil, tall oil, mixtures thereof, and distillation products and distillation residues thereof.

The free-flowing dry material may also be an organic material, an inorganic material and combinations thereof.

The effective amount of diluent may range from about 0.01% to about 99.9% by weight of the total weight of the coating composition, and the percent concentration by weight of the coating composition to the free-flowing dry material is preferably about 0.01%–2.0%.

The invention accordingly comprises the features, and combination of elements in the following description, and its scope, will be pointed out in the appended claims.

DETAILED DESCRIPTION OF THE INVENTION

The present invention relates to coating compositions and method of using such compositions for free-flowing dry materials as described above and hereinafter.

The methyl and/or ethyl esters useful in the present invention can be distilled, following reaction with an appropriate alcohol, by methods known in the art, from various sources including, but not limited to rapeseed oil, sunflower oil, corn oil, safflower oil and soybean oil. The esters useful in the present invention are chains of from 8 to 24 carbon atoms, with the following general formula $CH_3(CH_2)_nC—O—R=O$, wherein n=6–22 and R is $CH_3$ or $CH_2CH_3$. Methyl esters are the preferred diluents.

The coating compositions of the present invention do not interfere with the quality grade of the material. In particular, the coating compositions of the present invention contain an effective amount of 1) a methyl and/or ethyl esters of fatty acids, oils and combinations thereof, or 2) glycerols and polyglycerol esters of fatty acids, oils and combinations thereof, or 3) light petroleum oil, which is sufficient to provide a coating material having a viscosity that is suitable for spraying and even distribution on the free-flowing dry materials to reduce dust and cake formation. The coating composition of the present invention changes the surface characteristics of the material, rendering it resistant to caking and dust formation during shipment and storage.

The free-flowing dry materials treated include, but are not limited to: animal feed (cracked corn, wheat grain, whole oats), fertilizer micronutrients (animal feed ingredient $CaHPO_4.2H_2O$, sulfur (powdered or granular), iron oxide ore), construction/landscaping materials (cement, wood mulch), and other non-fertilizer materials (flour, vermiculite). The animal feeds and sulfur were purchased at a local farm store. IMC's Dynafos® ($CaHPO_4.2H_2O$) animal feed ingredient was obtained from their New Wales plant south of Mulberry, Fla. Iron oxide ore was received from Agrium-Kapuskasing Phosphate Operations, Kapuskasing, ON P5N 2Y1. Portland cement and cypress wood mulch were purchased from Lowe's Home Improvement, Winter Haven, Fla. The flour used was whole-wheat flour, purchased from Publix Supermarket, Winter Haven, Fla. The vermiculite used was an expanded, packing-material type, available from any commercial packaging supplier.

EXAMPLES

The following examples serve to provide further appreciation of the invention and are not meant in any way to restrict the effective scope of the invention.

Example 1

Thirty samples of 200 g each of either cypress mulch, $CaHPO_4.2H_2O$ animal feed ingredient, cracked corn (with and without wheat), whole oats, or vermiculite were weighed into 16-oz. glass jars and placed in a 140° F. oven for two hours, along with the oxidized oil coating compositions. The samples were removed from the oven and split into 10 sets of three samples each. Nine of the three-sample sets were coated with an oxidized oil composition and one three-sample set was left uncoated as a control.

The treatment process involved adding the oxidized oil composition to the container of the free-flowing dry material dropwise, followed by rolling each container on a rock tumbler (INDCO, Inc., New Albany, Ind.) for five minutes. A Varitemp™ heat gun (Master Appliance Corp., Racine, Wis.), set on high, was directed at each container of DAP during the five-minute tumbling process.

Dust levels of each sample were measured using the dust tower disclosed in U.S. Pat. No. 6,062,094 which is incorporated herein by reference, in its entirety. The results of the dust reduction data are shown in Table 1 below.

Example 2

Thirty samples of 200 g each of either whole wheat flour, Portland cement, iron oxide ore, or powdered sulfur were weighed into pint-size glass jars and placed in a 140° F. oven for two hours, along with the oxidized oil coating compositions. The samples were removed from the oven and split into 10 sets of three samples each. Nine of the three-sample sets were coated with an oxidized oil composition and one three-sample set was left uncoated as a control. The treatment process involved adding the oxidized oil composition to the container of the free-flowing dry material dropwise, followed by rolling of the container on a rock tumbler (INDCO, Inc, New Albany, Ind.) for five minutes. A Varitemp™ heat gun (Master Appliance Corp, Racine, Wis.), set on high, was directed at the sample container during the five-minute tumbling. Each of the samples was transferred from the glass jar to a rotary drum (6" diameter by 9.5" length) containing flights to facilitate dust generation for collection. The drum was fitted with a 12 inch length of ⁵⁄₁₆" ID polyethylene tubing (Tygon S-50-HL formulation, Saint-Gobain Performance Plastics Corporation, Akron, Ohio 44309). The Tygon tubing was also connected to the inlet of a filtration apparatus designed to incorporate a tared, glass microfiber filter (Whatman Air Sampling Filter EPM 2000, Whatman, Inc., Clifton, N.J. 07014). The outlet of the filtration apparatus was fitted with another 12 inch length of ⁵⁄₁₆" ID polyethylene tubing, connected to a laboratory vacuum pump (GAST, Model No. 0211-V45F-G8CX, Benton Harbor, Mich.). Dust collection of each sample involved tumbling of the sample using the rotary drum while pulling vacuum at 1 inch of Hg on the drum for three minutes. Removal of the glass microfiber filter followed by weighing gave the mass of dust collected. Dust levels for each of the samples were calculated as percent of control (untreated) dust level, as shown in Table 1 below.

TABLE 1

Dust Level as Percent of Control for Various Free Flowing Dry Materials Coated with Oxidized Oil Compositions.

| | Substrate | | | | |
|---|---|---|---|---|---|
| | Cypress Mulch | $CaHPO_4$ Animal Feed Ingredient | Cracked Corn | Whole Oats | Cracked Corn & Wheat |
| | Mean Control Dust Level (lbs/ton) | | | | |
| | 33.36 | 5.88 | 8.62 | 18.9 | 3.18 |
| | Coating Rate (gal/ton): | | | | |
| Oxidized Oil Coating Composition | 4.0 Dust Level (% of control) | 2.0 Dust Level (% of control) | 1.0 Dust Level (% of control) | 1.0 Dust Level (% of control) | 1.0 Dust Level (% of control) |
| Blown soy/PG ester | 84.05 | 57.48 | 44.86 | 54.50 | 42.08 |
| Blown soy/methyl ester | 81.65 | 56.46 | 48.93 | 46.03 | 41.45 |
| Blown soy/light petroleum | 77.70 | 31.12 | 65.53 | 57.67 | 52.26 |
| Blown lard/PG ester | 65.83 | 45.75 | 58.97 | 40.74 | 32.74 |
| Blown lard/methyl ester | 79.08 | 44.05 | 51.36 | 46.03 | 38.93 |
| Blown lard/light petroleum | 52.10 | 37.93 | 62.45 | 32.28 | 38.82 |
| Blown castor/PG ester | 82.55 | 38.44 | 58.04 | 26.98 | 37.78 |
| Blown castor/methyl ester | 88.37 | 46.60 | 58.39 | 25.93 | 33.58 |
| Blown castor/light petroleum | 71.76 | 50.34 | 54.56 | 42.86 | 31.37 |

TABLE 1-continued

Dust Level as Percent of Control for Various Free Flowing
Dry Materials Coated with Oxidized Oil Compositions.

| | Substrate: | | | | |
|---|---|---|---|---|---|
| | Vermiculite | Whole Wheat Flour | Portland Cement | Iron Oxide Ore | Sulfur Powder |
| | Mean Control Dust Level (lbs/ton) | | | | |
| | 54.96 | 0.27 | 0.41 | 0.26 | 0.79 |
| | Coating Rate (gal/ton): | | | | |
| Oxidized Oil Coating Composition | 1.0 Dust Level (% of control) | 2.0 Dust Level (% of control) | 1.0 Dust Level (% of control) | 2.0 Dust Level (% of control) | 2.0 Dust Level (% of control) |
| Blown soy/PG ester | 20.16 | 44.44 | 41.46 | 65.38 | 89.87 |
| Blown soy/methyl ester | 9.32 | 29.63 | 36.59 | 30.77 | 82.28 |
| Blown soy/light petroleum | 31.80 | 44.44 | 73.17 | 50.00 | 81.01 |
| Blown lard/PG ester | 55.97 | 25.93 | 60.98 | 61.54 | 79.75 |
| Blown lard/methyl ester | 32.75 | 25.93 | 73.17 | 57.69 | 63.29 |
| Blown lard/light petroleum | 37.12 | 22.22 | 41.46 | 80.77 | 45.57 |
| Blown castor/PG ester | 31.44 | 40.74 | 39.02 | 61.54 | 79.75 |
| Blown castor/methyl ester | 36.10 | 25.93 | 70.73 | 76.92 | 70.89 |
| Blown castor/light petroleum | 29.84 | 48.15 | 58.54 | 42.31 | 79.75 |

As shown in TABLE 1 and as explained above in the Examples 1 and 2, various representative oxidized oil coating compositions were applied at the indicated coating rates to the representative free-flowing dry materials cypress mulch, $CaHPO_4.2H_2O$ animal feed ingredient, cracked corn, whole oats, cracked corn and wheat, vermiculite, whole wheat flour, Portland cement, iron oxide ore, and powdered sulfur. The mean dust level is listed for the control (uncoated) dry material, followed by the dust level as percent of the control for each of the coated samples. The materials analyzed as described in Example 1 have a lower surface area, but a higher uncoated dust level than the materials analyzed as described in Example 2. This can be explained by the method in which dust was collected in Example 1 (dust tower) versus Example 2 (rotating drum). The dust tower uses a higher air flow to collect sample dust than the rotating drum and hence, would be expected to more efficiently move airborne dust to the collection filter. Materials with an average screen size less than approximately 30 mesh would not be suitable for dust analysis using the dust tower because of excess material plugging the filter. Samples with an average screen size less than approximately 30 mesh are analyzed using the rotating drum method because of the lower air flow and minimal agitation used.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A coated free-flowing dry material, wherein the coating composition comprises:

an oxidized oil; and an effective amount of a diluent selected from one of:

the group of methyl and ethyl esters of fatty acids, oils and combinations thereof, the group of glycerol and polyglycerol esters of fatty acids, oils, and combinations thereof, any one of said group of methyl and ethyl esters and said group of glycerol and polyglycerol esters with a light petroleum oil with a viscosity from about 1 cP to about 100 cP at 100° F., and any combinations of said group of methyl and ethyl esters, said group of glycerol and polyglycerol esters and said light petroleum oil, wherein the coating composition has a viscosity of from about 3 cP to about 5000 cP at 140° F., and wherein the coating composition is effective for reducing dust formation and cake formation in the coated free-flowing dry material.

2. The coated free-flowing dry material according to claim 1, wherein the free-flowing dry material is of a form selected from the group of, rolled, ground, crushed, milled, granular, powder, chipped or shredded solids and combinations thereof.

3. The coated free-flowing dry material according to claim 2, wherein the free-flowing dry material is selected from the group consisting of cracked corn, wheat grain, whole oats, animal feed ingredient $CaHPO_4.2H_2O$ wood mulch, flour, vermiculite, powdered sulfur, non-powdered sulfur, cement and iron ore.

4. The coated free-flowing dry material according to claim 1, wherein the fatty acids, oils and combinations thereof are derived from animal, plant and synthetic materials.

5. The coated free-flowing dry material according to claim 1, wherein the oxidized oil comprises:

canola oil, corn oil, cottonseed oil, sunflower oil, soybean oil, linseed oil, castor oil, tall oil, mixtures thereof, and distillation products and distillation residues thereof.

6. The coated free-flowing dry material according to claim 1, wherein the free-flowing dry material is an organic material, an inorganic material and combinations thereof.

7. The coated free-flowing dry material according to claim 1, wherein the effective amount of diluent is from about 0.01% to about 99.9% by weight of the total weight of the coating composition.

8. The coated free-flowing dry material according to claim 1, wherein a percent concentration by weight of the coating composition to the free-flowing dry material is about 0.01%–2.0%.

9. A composition for coating a free-flowing dry material, the composition comprising:
   an oxidized oil; and
   an effective amount of a diluent selected from one of:
      the group of methyl and ethyl esters of fatty acids, oils and combinations thereof,
      the group of glycerol and polyglycerol esters of fatty acids, oils, and combinations thereof, and
      any one of said group of methyl and ethyl esters and said group of glycerol and polyglycerol esters with a light petroleum oil with a viscosity from about 1 cP to about 100 cP at 100° F., and
      any combinations of said group of methyl and ethyl esters, said group of glycerol and polyglycerol esters and said light petroleum oil,
   wherein the coating composition has a viscosity of from about 3 cP to about 5000 cP at 140° F., and
   wherein the coating composition is effective for reducing dust formation and cake formation in the coated free-flowing dry material.

10. The composition according to claim 9, wherein the free-flowing dry material is of a form selected from the group of, rolled, ground, crushed, milled, granular, powder, chipped or shredded solids and combinations thereof.

11. The composition according to claim 10, wherein the free-flowing dry material is selected from the group consisting of cracked corn, wheat grain, whole oats, animal feed ingredient $CaHPO_4.2H_2O$, wood mulch, flour, vermiculite, powdered sulfur, non-powdered sulfur, cement and iron ore.

12. The composition according to claim 9, wherein the fatty acids, oils and combinations thereof are derived from animal, plant and synthetic materials.

13. The composition according to claim 9, wherein the oxidized oil comprises:
   canola oil, corn oil, cottonseed oil, sunflower oil, soybean oil, linseed oil, castor oil, tall oil, mixtures thereof, and distillation products and distillation residues thereof.

14. The composition according to claim 9, wherein the free-flowing dry material is an organic material, an inorganic material and combinations thereof.

15. The composition according to claim 9, wherein the effective amount of diluent is from about 0.01% to about 99.9% by weight of the total weight of the coating composition.

16. The composition according to claim 9, wherein a percent concentration by weight of the coating composition to the free-flowing dry material is about 0.01%–2.0%.

17. A method for controlling dust levels for a free-flowing dry material comprising the step of:
   coating the free-flowing dry material with a composition comprising:
      an oxidized oil; and
      an effective amount of a diluent selected from one of:
         the group of methyl and ethyl esters of fatty acids, oils and combinations thereof,
         the group of glycerol and polyglycerol esters of fatty acids, oils, and combinations thereof,
         any one of said group of methyl and ethyl esters and said group of glycerol and polyglycerol esters with a light petroleum oil with a viscosity from about 1 cP to about 100 cP at 100° F. and
         any combinations of said group of methyl and ethyl esters, said group of glycerol and polyglycerol esters and said light petroleum oil,
      wherein the coating composition has a viscosity of from about 3 cP to about 5000 cP at 140° F., and
      wherein the coating composition is effective for reducing dust formation and cake formation in the coated free-flowing dry material.

18. The method according to claim 17, wherein the free-flowing dry material is of a form selected from the group of, rolled, ground, crushed, milled, granular, powder, chipped or shredded solids and combinations thereof.

19. The method according to claim 18, wherein the free-flowing dry material is selected from the group consisting of cracked corn, wheat grain, whole oats, animal feed ingredient $CaHPO_4.2H_2O$, wood mulch, flour, vermiculite, powdered sulfur, non-powdered sulfur, cement and iron ore.

20. The method according to claim 17, wherein the fatty acids, oils and combinations thereof are derived from animal, plant and synthetic materials.

21. The method according to claim 17, wherein the oxidized oil comprises:
   canola oil, corn oil, cottonseed oil, sunflower oil, soybean oil, linseed oil, castor oil, tall oil, mixtures thereof, and distillation products and distillation residues thereof.

22. The method according to claim 17, wherein the free-flowing dry material is an organic material, an inorganic material and combinations thereof.

23. The method according to claim 17, wherein the effective amount of diluent is from about 0.01% to about 99.9% by weight of the total weight of the coating composition.

24. The method according to claim 17, wherein a percent concentration by weight of the coating composition to the free-flowing dry material is about 0.01%–2.0%.

25. A coated free-flowing dry material, wherein the coating composition comprises:
   an oxidized oil; and
   an effective amount of a diluent selected from one of:
      the group of methyl and ethyl esters of fatty acids, oils and combinations thereof,
      the group of glycerol and polyglycerol esters of fatty acids, oils, and combinations thereof, and
      combinations of said group of methyl and ethyl esters and said group of glycerol and polyglycerol esters,
   wherein the coating composition has a viscosity of from about 3 cP to about 5000 cP at 140° F., and
   wherein the coating composition is effective for reducing dust formation and cake formation in the coated free-flowing dry material.

26. The coated free-flowing dry material according to claim 25, wherein the free-flowing dry material is of a form selected from the group of, rolled, ground, crushed, milled, granular, powder, chipped or shredded solids and combinations thereof.

27. The coated free-flowing dry material according to claim 26, wherein the free-flowing dry material is selected from the group consisting of cracked corn, wheat grain, whole oats, animal feed ingredient $CaHPO_4.2H_2O$, wood mulch, flour, vermiculite, powdered sulfur, non-powdered sulfur, cement and iron ore.

28. The coated free-flowing dry material according to claim 25, wherein the fatty acids, oils and combinations thereof are derived from animal, plant and synthetic materials.

29. The coated free-flowing dry material according to claim 25, wherein the oxidized oil comprises:
   canola oil, corn oil, cottonseed oil, sunflower oil, soybean oil, linseed oil, castor oil, tall oil, mixtures thereof, and distillation products and distillation residues thereof.

30. The coated free-flowing dry material according to claim 25, wherein the free-flowing dry material is an organic material, an inorganic material and combinations thereof.

31. The coated free-flowing dry material according to claim 25, wherein the effective amount of diluent is from about 0.01% to about 99.9% by weight of the total weight of the coating composition.

32. The coated free-flowing dry material according to claim 25, wherein a percent concentration by weight of the coating composition to the free-flowing dry material is about 0.01%–2.0%.

33. A composition for coating a free-flowing dry material, the composition comprising:
   an oxidized oil; and
   an effective amount of a diluent selected from one of:
      the group of methyl and ethyl esters of fatty acids, oils and combinations thereof,
      the group of glycerol and polyglycerol esters of fatty acids, oils, and combinations thereof, and
      combinations of said group of methyl and ethyl esters and said group of glycerol and polyglycerol esters,
   wherein the coating composition has a viscosity of from about 3 cP to about 5000 cP at 140° F., and
   wherein the coating composition is effective for reducing dust formation and cake formation in the coated free-flowing dry material.

34. The composition according to claim 33, wherein the free-flowing dry material is of a form selected from the group of, rolled, ground, crushed, milled, granular, powder, chipped or shredded solids and combinations thereof.

35. The composition according to claim 34, wherein the free-flowing dry material is selected from the group consisting of cracked corn, wheat grain, whole oats, animal feed ingredient $CaHPO_4.2H_2O$, wood mulch, flour, vermiculite, powdered sulfur, non-powdered sulfur, cement and iron ore.

36. The composition according to claim 33, wherein the fatty acids, oils and combinations thereof are derived from animal, plant and synthetic materials.

37. The composition according to claim 33, wherein the oxidized oil comprises:
   canola oil, corn oil, cottonseed oil, sunflower oil, soybean oil, linseed oil, castor oil, tall oil, mixtures thereof, and distillation products and distillation residues thereof.

38. The composition according to claim 33, wherein the free-flowing dry material is an organic material, an inorganic material and combinations thereof.

39. The composition according to claim 33, wherein the effective amount of diluent is from about 0.01% to about 99.9% by weight of the total weight of the coating composition.

40. The composition according to claim 33, wherein a percent concentration by weight of the coating composition to the free-flowing dry material is about 0.01%–2.0%.

41. A method for controlling dust levels for a free-flowing dry material comprising the step of:
   coating the free-flowing dry material with a composition comprising:
      an oxidized oil; and
      an effective amount of a diluent selected from one of:
         the group of methyl and ethyl esters of fatty acids, oils and combinations thereof,
         the group of glycerol and polyglycerol esters of fatty acids, oils, and combinations thereof, and
         combinations of said group of methyl and ethyl esters and said group of glycerol and polyglycerol esters,
      wherein the coating composition has a viscosity of from about 3 cP to about 5000 cP at 140° F., and
      wherein the coating composition is effective for reducing dust formation and cake formation in the coated free-flowing dry material.

42. The method according to claim 41, wherein the free-flowing dry material is of a form selected from the group of, rolled, ground, crushed, milled, granular, powder, chipped or shredded solids and combinations thereof.

43. The method according to claim 42, wherein the free-flowing dry material is selected from the group consisting of cracked corn, wheat grain, whole oats, animal feed ingredient $CaHPO_4.2H_2O$, wood mulch, flour, vermiculite, powdered sulfur, non-powdered sulfur, cement and iron ore.

44. The method according to claim 41, wherein the fatty acids, oils and combinations thereof are derived from animal, plant and synthetic materials.

45. The method according to claim 41, wherein the oxidized oil comprises:
   canola oil, corn oil, cottonseed oil, sunflower oil, soybean oil, linseed oil, castor oil, tall oil, mixtures thereof, and distillation products and distillation residues thereof.

46. The method according to claim 41, wherein the free-flowing dry material is an organic material, an inorganic material and combinations thereof.

47. The method according to claim 41, wherein the effective amount of diluent is from about 0.01% to about 99.9% by weight of the total weight of the coating composition.

48. The method according to claim 41, wherein a percent concentration by weight of the coating composition to the free-flowing dry material is about 0.01–%2.0%.

* * * * *

UNITED STATES PATENT AND TRADEMARK OFFICE
CERTIFICATE OF CORRECTION

PATENT NO. : 6,776,832 B2
DATED : August 17, 2004
INVENTOR(S) : Stacy K. Spence et al.

It is certified that error appears in the above-identified patent and that said Letters Patent is hereby corrected as shown below:

Column 1,
Lines 26 and 67, replace "$CaHPO_4.2H_2O$" with -- $CaHPO_4 \cdot 2H_2O$ --.

Column 2,
Line 66, replace "$CaHPO_4.2H_2O$" with -- $CaHPO_4 \cdot 2H_2O$ --.

Column 3,
Lines 3 and 23, replace "$CaHPO_4.2H_2O$" with -- $CaHPO_4 \cdot 2H_2O$ --.

Column 5,
Line 34, replace "$CaHPO_4.2H_2O$" with -- $CaHPO_4 \cdot 2H_2O$ --.

Column 6,
Line 54, replace "$CaHPO_4.2H_2O$ wood mulch" with -- $CaHPO_4 \cdot 2H_2O$ wood mulch --.

Column 7,
Line 16, replace "combinations thereof, end" with -- combinations thereof, --.
Line 36, replace "$CaHPO_4.2H_2O$" with -- $CaHPO_4 \cdot 2H_2O$ --.

Column 8,
Lines 18 and 61, replace "$CaHPO_4.2H_2O$" with -- $CaHPO_4 \cdot 2H_2O$ --.

Column 9,
Line 37, replace "$CaHPO_4.2H_2O$" with -- $CaHPO_4 \cdot 2H_2O$ --.

Column 10,
Line 31, replace "$CaHPO_4.2H_2O$" with -- $CaHPO_4 \cdot 2H_2O$ --.

Signed and Sealed this

Twenty-second Day of March, 2005

JON W. DUDAS
*Director of the United States Patent and Trademark Office*